(12) United States Patent
Bent et al.

(10) Patent No.: US 10,095,427 B2
(45) Date of Patent: Oct. 9, 2018

(54) DYNAMIC RESILIENCE IN FLASH ACCELERATION TIERS

(71) Applicant: EMC Corporation, Hopkinton, MA (US)

(72) Inventors: John M. Bent, Los Alamos, NM (US); Sorin Faibish, Newton, MA (US); Sassan Teymouri, Saratoga, CA (US); James M. Pedone, Jr., West Boylston, MA (US); Dennis Pei Jean Ting, Groton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/755,913

(22) Filed: Jun. 30, 2015

(65) Prior Publication Data
US 2017/0185321 A1    Jun. 29, 2017

(51) Int. Cl.
*G06F 12/00* (2006.01)
*G06F 3/06* (2006.01)
*G06F 12/0804* (2016.01)

(52) U.S. Cl.
CPC ............ *G06F 3/0619* (2013.01); *G06F 3/065* (2013.01); *G06F 3/0626* (2013.01); *G06F 3/0629* (2013.01); *G06F 3/0683* (2013.01); *G06F 12/0804* (2013.01); *G06F 2212/60* (2013.01)

(58) Field of Classification Search
CPC .... G06F 3/0619; G06F 3/0626; G06F 3/0629; G06F 3/065; G06F 3/0683; G06F 12/0804; G06F 2212/60
See application file for complete search history.

(56) References Cited

U.S. PATENT DOCUMENTS

| | | | | |
|---|---|---|---|---|
| 7,292,969 B1 * | 11/2007 | Aharoni | ............... | G06F 11/3419 703/21 |
| 8,433,848 B1 * | 4/2013 | Naamad | ................ | G06F 3/0605 711/114 |
| 8,843,459 B1 * | 9/2014 | Aston | ............... | G06F 17/30067 707/694 |
| 9,092,159 B1 * | 7/2015 | Taylor | ................... | G06F 3/0685 |

(Continued)

OTHER PUBLICATIONS

John Harker "Tiered Storage Design Guide," 2010, Hitachi Data Systems Corporation, pp. 1-20.*

(Continued)

*Primary Examiner* — David Yi
*Assistant Examiner* — Francisco A Grullon
(74) *Attorney, Agent, or Firm* — Krishnendu Gupta; Konrad R. Lee (57) ABSTRACT

A System, Computer program product, and computer-executable method of dynamically modifying data storage resilience within a two tiered data storage system, where the two tiered data storage system includes one or more fast data storage appliances and storage capacity tier wherein the fast data storage appliance is enabled to provide reliable data storage, the System, Computer program product, and computer-executable method including receiving configuration information from a node utilizing the two-tiered data storage system, wherein the configuration information provides characteristics of a job, analyzing the configuration information, updating use of the fast data storage appliances based on the analysis.

20 Claims, 9 Drawing Sheets

(56) References Cited

U.S. PATENT DOCUMENTS

| | | | |
|---|---|---|---|
| 9,298,733 B1* | 3/2016 | Faibish | G06F 17/302 |
| 9,569,569 B1* | 2/2017 | Colon | G06F 17/5022 |
| 9,720,763 B2* | 8/2017 | Rajasekharan | G06F 11/0793 |
| 2014/0108707 A1* | 4/2014 | Nowoczynski | G06F 12/0246 |
| | | | 711/103 |
| 2016/0062837 A1* | 3/2016 | Slik | G06F 11/1076 |
| | | | 714/6.24 |
| 2016/0314043 A1* | 10/2016 | Slik | G06F 11/1076 |

OTHER PUBLICATIONS

"Implementing Fully Automated Storage Tiering (FAST) for EMC Symmetrix VMAX Series Arrays", Jun. 28, 2010 EMC corporation, pp. 1-142.*

* cited by examiner

DYNAMIC RESILIENCE IN FLASH ACCELERATION TIERS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A System, Computer program product, and computer-executable method of dynamically modifying data storage resilience within a two tiered data storage system, where the two tiered data storage system includes one or more fast data storage appliances and storage capacity tier wherein the fast data storage appliance is enabled to provide reliable data storage, the System, Computer program product, and computer-executable method including receiving configuration information from a node utilizing the two-tiered data storage system, wherein the configuration information provides characteristics of a job, analyzing the configuration information, updating use of the fast data storage appliances based on the analysis.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Traditionally, many distributed systems use a consistent distributed state capture mechanism to replicate data between a source site and a remote site. Typically, replication using a consistent distributed state capture mechanism is limited by the speed at which a distributed system is able to complete replication cycles. Conventionally, improvements to replication using a consistent distributed state capture mechanism would be beneficial to the data storage industry.

Evaluating Use of Fast Tier

In many embodiments, the current disclosure may enable analysis of the use of dynamic resilience in a two tier data storage system. In various embodiments, a two tier data storage system may include a Fast Data Storage Tier and a capacity tier. In certain embodiments, a two tiered data storage system may be enabled to handle variable amounts of resilience in the fast data storage tier. In most embodiments, a fast data storage tier may be enabled to provide reliable data storage, less reliable data storage, and/or data storage with no reliability. In various embodiments, capacity tier may mean object tier and/or vice versa. In most embodiments, a distributed state capture mechanism may include a checkpoint mechanism, snapshot mechanism, and/or other state capture mechanism.

In many embodiments, the current disclosure may enable analysis of whether or not to provide data reliability in a Fast Data Storage Tier. In various embodiments, the current disclosure may enable a data storage system to determine whether or not to provide data reliability in a Fast Data Storage tier. In certain embodiments, the current disclosure may enable a cost-benefit analysis of whether to provide data reliability at a Fast Data Storage Tier.

In most embodiments, the current disclosure may be enabled to provide a workflow analysis of whether to use reliability in a Fast Data Storage Tier. In various embodiments, analysis may be completed by comparing the workflow between use of reliable and normal Fast Data Storage Tier in a computing solution.

In some embodiments, the following equation may represent the amount of time to recover from a capacity tier.

$$T^{Cap} = O + CO + CK^{Nor} \quad\quad 1)$$

In these embodiments, O may represent the time to read checkpoint data from capacity tier. In various embodiments, CO may represent the time to repeat the lost compute processing. In some embodiments, $CK^{Nor}$ may represent the time to repeat the checkpoint phase.

In most embodiments, the following equation may represent the workflow using a reliable Fast Data Storage Tier.

$$W^{Rel} = N*(CO + CK^{Rel}) + T^{Rel} \quad\quad 2)$$

In most embodiments, $T^{Rel}$ may represent the time to recover using a reliable Fast Data Storage Tier. In various embodiments, N may represent the number compute cycles to be completed before an expected data failure.

In many embodiments, the following equation may represent the workflow using a normal Fast Data Storage Tier (without use of reliability methods).

$$W^{Nor} = N*(CO + CK^{Nor}) + T^{Nor} \quad\quad 3)$$

In various embodiments, $CK^{Nor}$ may represent the time to repeat a checkpoint phase using a normal Fast Data Storage Tier (without use of reliability methods). In certain embodiments, $T^{Nor}$ may represent the time to recover using a normal Fast Data Storage Tier (without use of reliability methods).

In most embodiments, the time to repeat a checkpoint using reliable Fast Data storage Tier may equal the time to repeat a checkpoint using normal Fast Data Storage Tier multiplied by the amount of parity, represented as P, which may range from 3× (for HDFS style reliability) to 1.2× (for efficient erasure rates).

$$CK^{Rel} = CK^{Nor}*P \quad\quad 4)$$

With a reliable Fast Data Storage Tier, the recovery time, $T^{Rel}$ may be the time to read the checkpoint data from the reliable fast data storage tier. Therefore, assuming that read and write rates are approximately equal:

$$T^{Rel} = CK^{Rel} \quad\quad 5)$$

In many embodiments, the trade-off between a reliable and a non-reliable Fast Data Storage Tier may be that the non-reliable Fast Data Storage Tier may offer a faster checkpoint whereas the reliable Fast Data Storage Tier may offer a faster recovery time.

In most embodiments, Equations 1-5 may be utilized to determine whether a job would benefit from using a reliable fast data storage tier or a non-reliable fast data storage tier. For example, in one embodiment, an enterprise compute environment may have the following characteristics.

| | |
|---|---|
| Compute Nodes | 100K |
| Compute Cores | 1 Billion |
| Checkpoint Data | 1 EB/Day |
| Compute Node:Fast Tier | 100:1 |
| Burst Time | 5 Minutes |
| Drain Time | 60 Minutes |
| Mean Time To Interrupt | 1 day |

In this embodiment, the above characteristics were taken from D. E. I. S. Committee. A decadal DOE plan for providing exascale applications and technologies for DOE mission needs. Technical report, 2009. In this embodiment, from the ratio of Compute Nodes to Fast Data Storage Tiers (100:1), a simultaneous interrupt of both a Compute Node and a Fast Data Storage Tier may be extrapolated to no more than one percent of the interrupt rate. As the interrupt rate is one day, N is 24 as one recovery per day may be required. Thus, a recovery rate using a non-reliable fast data storage Tier $T^{Nor}$ may be defined as recoveries from the fast data storage tier may be expected to be 99% and the expected recoveries from an associated capacity Tier may be 1%.

$$T^{Nor} = 0.99*CK^{Nor} + 0.01*T^{Cap} \quad\quad 6$$

In this embodiment, as variables are defined, workflows of reliable and non-reliable Fast Data Storage Tier may be compared.

$$W^{Rel} = 24*(60 + P*5) + P*5 \quad\quad 7$$

$$W^{Nor} = 24*(60+5)(0.99*5 + 0.01*(60+60+5)) \quad\quad 8$$

Figure 1:
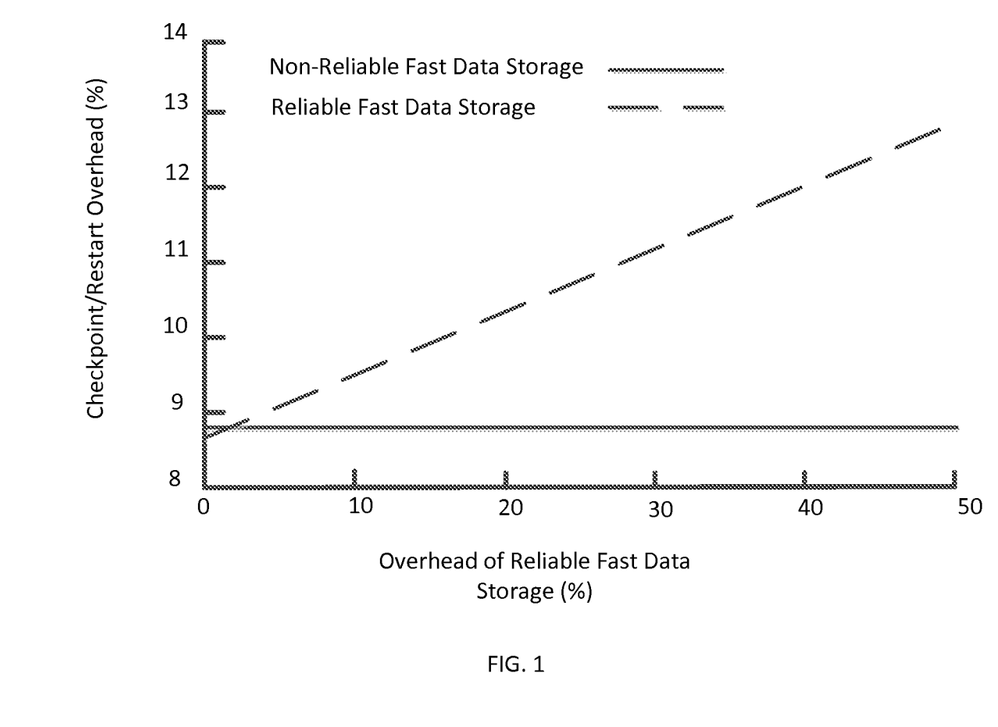
FIG. 1 shows the comparison of the workflows of reliable and non-reliable.

As shown, Equation 7 simplifies to 125P+1440 minutes of total runtime for a compute workload of one day. Whereas the workflow for a non-reliable Fast Data Storage Tier simplifies to 1566.2 minutes of total runtime for a compute workload of one day (an overhead of less than 9%). A total time to completion of a workflow using a non-reliable Fast Storage Tier is faster (by slightly more than one percent) than using a reliable Fast Storage Tier with a 20% parity overhead as would be typical for an erasure coding parity. FIG. 1 shows the comparison of the workflows of reliable and non-reliable. In this embodiment, as the reliability of a reliable Fast Data Storage only required once every 100 days, the complexity of reliable Fast Data Storage is not needed in this instance.

In many embodiments, if recoveries from a Fast Data Storage Tier is be expected to be less than 99%, there may be more opportunities to where a reliable Fast Data Storage Tier would be more efficient than a non-reliable Fast Data Storage Tier.

Advanced Metadata Management

In many embodiments the current disclosure may enable a data management module to manage multi-dimensional metadata stored within a HPC environment. In various embodiments, an I/O Dispatcher module may be a data management module which may create metadata about objects, containers, and/or events stored within a data storage system. In certain embodiments, an I/O Dispatcher module may be enabled to utilize a distributed metadata KV store, such as MDHIM. In other embodiments, an I/O Dispatcher module may manage metadata in the form of a list of burst buffers across which each portion of data is stored. In some embodiments, an I/O Dispatcher may be enabled to manage metadata received from two or more sources.

More information regarding an I/O Dispatcher and Burst Buffer Data Storage may be found in U.S. patent application Ser. No. 14/230,829 entitled "Advanced Metadata Management" which is commonly assigned herewith and incorporated by reference herein.

Dynamic Resilience in Flash Accelerated Tiers

In many embodiments, the current disclosure may enable a two tiered data storage system to dynamically manage resilience within the data storage system. In various embodiments, the current disclosure may enable a two tiered data storage system to utilize data reliability techniques on a portion of jobs utilizing the two tiered data storage system. In certain embodiments, the current disclosure may enable a two tiered data storage system to analyze temporal data about a job to determine what types of data reliability may be used to complete the job. In most embodiments, a two tiered data storage system may selected to use data reliability techniques on metadata, created data, and/or both metadata and created data.

In many embodiments, a two tiered data storage system may be enabled to identify temporal data associated with one or more jobs using the two tiered data storage system. In various embodiments, using temporal data, a two tiered data storage system may be enabled to make determinations about the value of the data. In some embodiments, a two tiered data storage system may be enabled to analyze and/or understand the cost and probability of losing the data. In certain embodiments, a two tiered data storage system may be enabled to determine that there may be little or no probability of data being lost. In other embodiments, a two tiered data storage system may be enabled to determine whether loss of data incurs little to no cost and therefore may not need any special protections.

In many embodiments, a two tiered data storage system may be enabled to analyze and/or weigh the cost and benefits of protecting data stored in the two tiered data storage system. In various embodiments, if the cost of protecting data is high and the benefit is low, then the two tiered data storage system may be enabled to decide to not protect the resulting data. In certain embodiments, if the cost is low and the benefit is high, a two tiered data storage system may be enabled to decide to protect resulting data through data protection techniques, such as through RAID, replication, erasure coding, and/or other data protection techniques. In most embodiments, a two tiered data storage system may be enabled to provide partial data protection, wherein the two tiered data storage system may protect the metadata instead of the resulting data. In various embodiments, while providing partial data protection, the cost may be lower than protecting the data and may enable a two tier data storage system to recover some of the lost data quickly.

In most embodiments, a two tiered data storage system may be enabled to determine whether a deterministic application computes for a long time and produces a small amount of data. In various embodiments, when a small amount of data may be created, a two tiered data storage system may be enabled to determine whether the data should be protected based on the cost of losing the data. In certain embodiments, a two tiered data storage system may be enabled to determine that an application that computes for a shorter period of time and produces a large amount of data should not be provided with advance data protection as the data may be reproduced fairly quickly and/or easily. In some embodiments, a two tiered data storage system may be enabled to determine whether an application fetches a large amount of data from the disk tier into the flash tier and reads the data multiple times in an environment where the fetch time is high and the failure rate is low. In certain embodiments, a two tiered data storage system may be enabled to determine that only the metadata should be replicated such that partial data loss may be recovered by re-fetching any lost data from Slower data storage. In most embodiments, a two tiered data storage system may be enabled to detect whether a sensor network streams high value data into a flash tier where it may be analyzed before migrating to a disk tier. In various embodiments, non-deterministic data may dictate to a two tiered data storage system that the data must be protected.

In most embodiments, a two tiered data store system may include a first tier of one or multiple fast data storage appliances. In various embodiments, a two tiered data storage system may include a second tier of data storage. In some embodiments, the second tier of data storage may be a capacity tier, wherein the capacity tier may be File, Block, Object, and/or other file system. In certain embodiments, a second tier of data storage may be one or more data storage arrays. In some embodiments, a second tier of data storage may include a data storage service on one or more data storage systems. In many embodiments, a fast data storage appliance may include an I/O Dispatcher, analysis module, a buffer (fast data storage), and/or a data management module. In various embodiments, a buffer may non-volatile memory, such as flash data storage.

In many embodiments, an I/O Dispatcher may be enabled to communicate to a capacity tier as well as every other Fast data storage appliance within the two tiered data storage system. In various embodiments, each Fast Data Storage Appliance may be enabled to receive I/Os and/or other information from a compute node and forward the I/Os and/or other information to the appropriate Fast Data Storage Appliance. In some embodiments, a two tiered data storage system may be enabled to implement one or multiple types of data protection across one or more of the fast data storage appliances. In certain embodiments, a portion of the fast data storage appliance may be enabled to be configured to provide a type of RAID protection for data stored on a designated portion of the fast data storage appliances. In certain embodiments, a portion of data storage appliances may be enabled to be configured to provide a fast caching capability with no data protection services. In other embodiments, a portion of fast data storage appliances may be enabled to be configured to provide data protection services, such as data striping, erasure coding, replication, and/or other data protection techniques. In some embodiments, a fast data storage appliance may be enabled to provide data protection and/or increased data reliability on data itself and/or metadata associated with the data.

Figure 2:
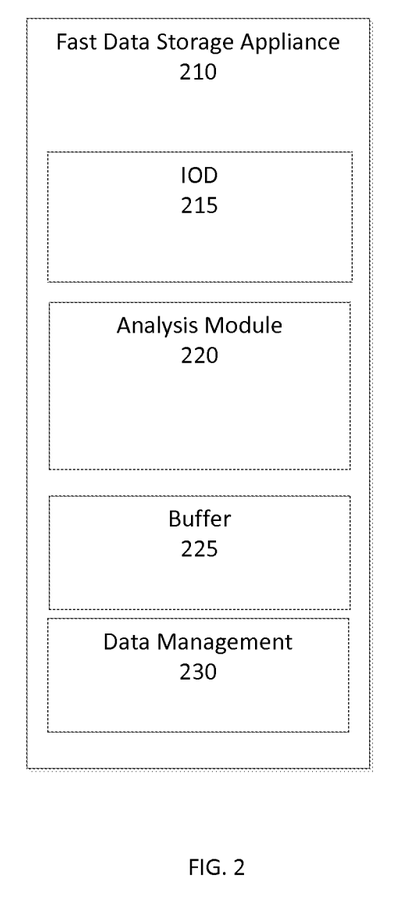
FIG. 2 is a simplified illustration of a Fast Data Storage Appliance, in accordance with an embodiment of the present disclosure.

Refer to the example embodiment of FIG. 2. FIG. 2 is a simplified illustration of a Fast Data Storage Appliance, in accordance with an embodiment of the present disclosure. Fast Data Storage Appliance 210 includes I/O Dispatcher (IOD) 215, Analysis module 220, Buffer 225, and data management module 230. I/O Dispatcher 215 is enabled to communicate with other Fast Data Storage Appliances and enabled to forward I/Os and other information to other Fast Data Storage Appliances. In many embodiments, an I/O Dispatcher may be enabled to lead and/or direct other I/O Dispatchers within a two tiered data storage system. Analysis module 220 is enabled to analyze I/Os and/or information about jobs to make determinations based on workflow of a job and/or set of incoming I/Os. Buffer 225 is fast data storage. In most embodiments, a buffer may be a flash data storage, non-volatile Memory, and/or other advance memory technology. Data management module 230 enables flash data storage appliance 210 to move data to and from other Fast Data Storage Appliances and/or external data storage, such an capacity tier which may include one or multiple data storage arrays and/or data storage systems.

Figure 3:
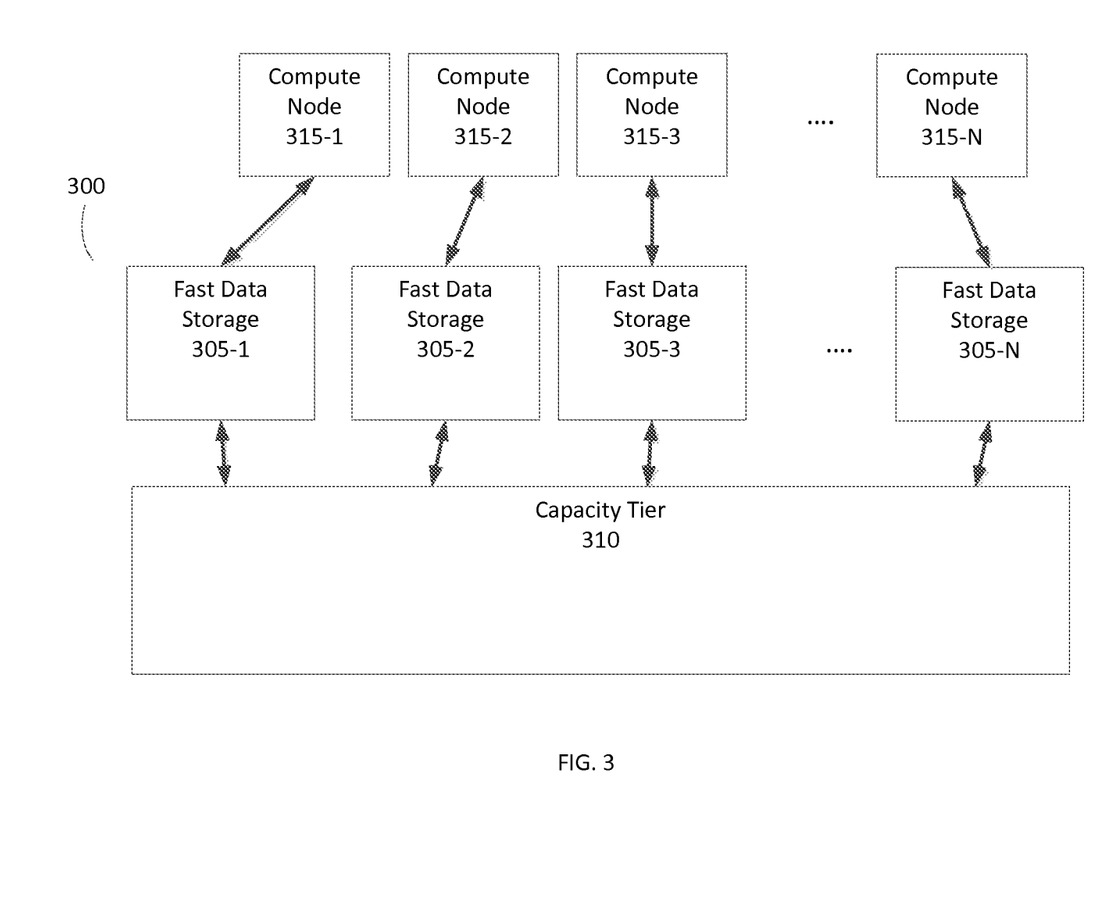
FIG. 3 is a simplified illustration of a two tiered data storage system, in accordance with an embodiment of the present disclosure.

Refer to the example embodiment of FIG. 3. FIG. 3 is a simplified illustration of a two tiered data storage system, in accordance with an embodiment of the present disclosure. Two tiered data storage system 300 includes Fast data storage Appliances (305-1 . . . N, 305 Generally) and a capacity tier 310. In many embodiments, a capacity tier may be one or multiple data storage arrays using file, block, object, and/or other file systems. Two tiered data storage system 300 is enabled to include a plurality of Fast Data Storage appliances 305. Each Fast Data Storage appliance 305 is in communication with capacity tier 310. Each Fast Data Storage Appliance 305 is in communication with every other fast data storage Appliance 305. In this embodiment, Compute Nodes (315-1 . . . N, 315 Generally) each communicate with at least one of the fast data storage appliances 305. Compute nodes 315 are enabled to communicate with any of fast data storage appliances 305 to access data storage at any of the fast data storage appliances 305. Two tiered data storage system 300 is enabled to configure fast data storage appliances 305 in one or in multiple different configurations.

Figure 4:
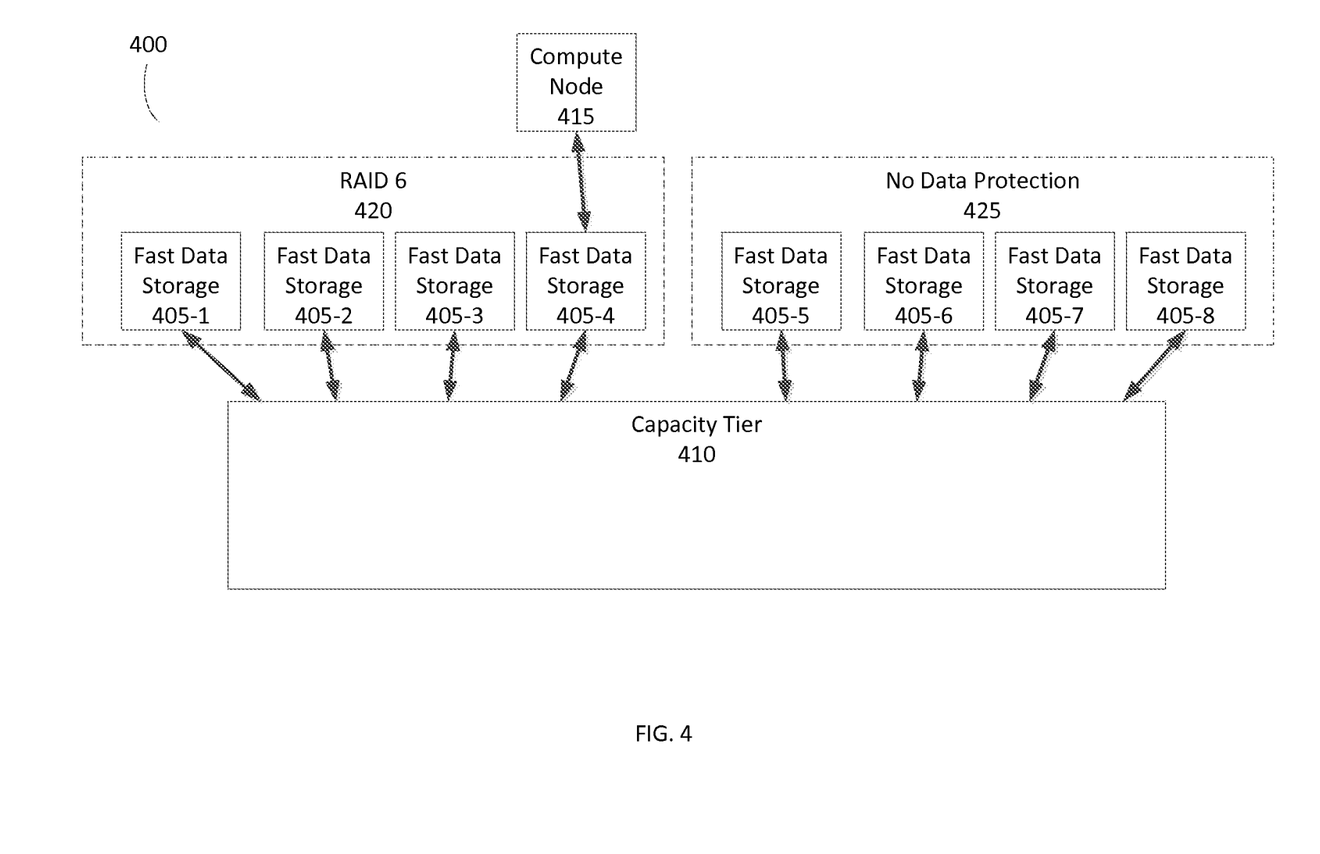
FIG. 4 is an alternate simplified illustration of a two-tiered data storage system, in accordance with an embodiment of the present disclosure.

Refer to the example embodiment of FIG. 4. FIG. 4 is an alternate simplified illustration of a two-tiered data storage system, in accordance with an embodiment of the present disclosure. Two tiered data storage system 400 includes fast data storage appliances (405-1 . . . 8, 405 Generally) and Capacity Tier 410. Each of the fast data storage appliances 405 are in communication with capacity tier 410. Two tiered data storage system 400 has been configured to have a portion of fast data storage appliances 405 to be implemented using RAID 6 (420) and a portion of fast data storage appliances 405 with no data protection (425). Compute node 415 is enabled to utilize RAID 6 (420) or No Data Protection data storage (425) by communicating with any of Fast Data Storage Appliances 405. In this embodiment, RAID 6 (420) is comprised of Fast Data Storage 405-1, 405-2, 405-3, and 405-4. No protection (425) is comprised of Fast Data Storage appliances 405-5, 405-6, 405-7, and 405-8. Two tiered data storage system 400 is enabled to utilize RAID 6 (420) and/or No Data Protection (425) to provide data storage and/or data services to jobs running on compute node 415.

Figure 5:
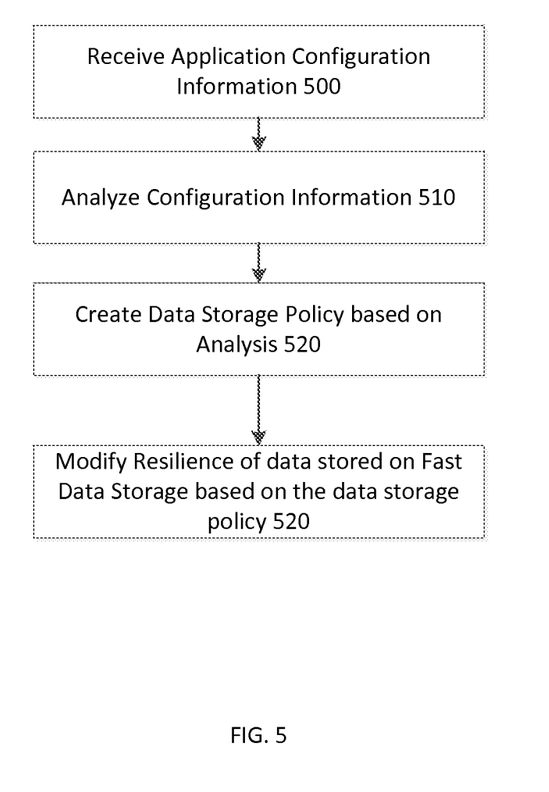
FIG. 5 is a simplified flowchart of a method of managing jobs received by a two tiered data storage system as shown in FIG. 4, in accordance with an embodiment of the present disclosure.

Refer to the example embodiments of FIGS. 4 and 5. FIG. 5 is a simplified flowchart of a method of managing jobs received by a two tiered data storage system as shown in FIG. 4, in accordance with an embodiment of the present disclosure. Two tiered data storage system 400 includes fast data storage appliances (405-1 . . . 8, 405 Generally) and Capacity Tier 410. Each of the fast data storage appliances 405 are in communication with capacity tier 410. In this embodiment, fast data storage appliance 405-4 receives application configuration information from compute node 415 (Step 500). The analysis module within fast Data Storage Appliance 405-5 analyzes the configuration information (Step 510) and provides the I/O Dispatcher with the analysis information. The I/O Dispatcher on Fast Data Storage Appliance 405-5 creates a data storage policy based on the analysis (Step 520). The I/O Dispatcher modifies the resilience of I/Os and/or data received from compute node 415 based on the data storage policy (Step 530). In this embodiment, compute node 415 is requesting resources for a job that takes two days to complete that will create one gigabyte of data. The Analysis module on Fast Data Storage Appliance 405-4 calculates the workflow using reliable Fast data storage and non-reliable fast data storage and determines that reliable fast data storage would be more efficient. Two Tiered Data Storage System 400 utilizes Fast Data Storage appliances 405-1, 405-2, 405-3, 405-4 implementing RAID 6 (420) to provide data protection for the job requested by compute node 415.

Figure 6:
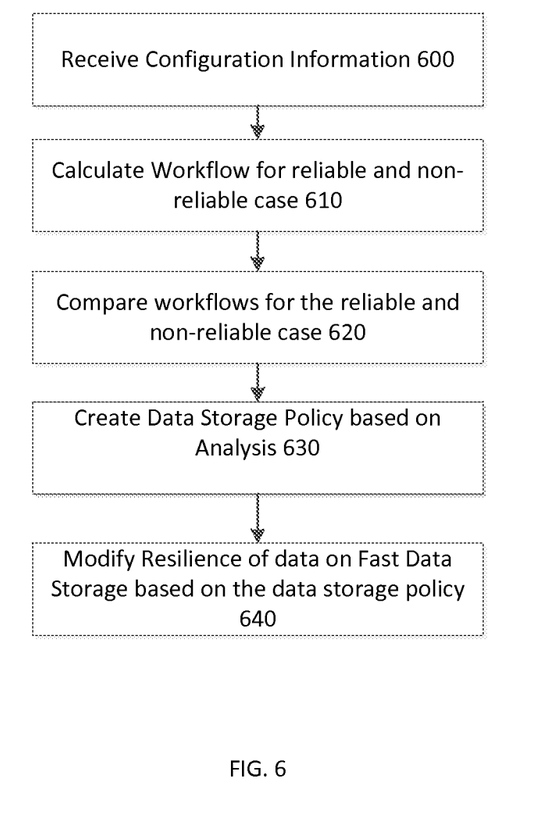
FIG. 6 is an alternate simplified flowchart of a method of managing data on a two tiered data storage system as shown in FIG. 4, in accordance with an embodiment of the present disclosure.

Refer to the example embodiments of FIGS. 4 and 6. FIG. 6 is an alternate simplified flowchart of a method of managing data on a two tiered data storage system as shown in FIG. 4, in accordance with an embodiment of the present disclosure. Two tiered data storage system 400 includes fast data storage appliances (405-1 . . . 8, 405 Generally) and capacity tier 410. Each of the fast data storage appliances 405 are in communication with capacity tier 410. Fast Data Storage appliance 405-4 receives configuration information from Compute node 415 regarding one or more jobs (Step 600). In many embodiments, a job may include receiving data and/or data I/Os from one or multiple compute nodes. The I/O dispatcher within Fast Data Storage 405-4 uses an analysis module to calculate workflows for use of reliable and non-reliable Fast Data Storage (Step 610). The analysis module compares the workflows for the reliable and non-reliable case (Step 620) and creates a data storage policy based on the analysis (Step 630). I/O Dispatcher modifies the resilience of data, associated with the received configuration information, on Fast Data Storage appliances 405 based on the data storage policy (Step 640).

Figure 7:
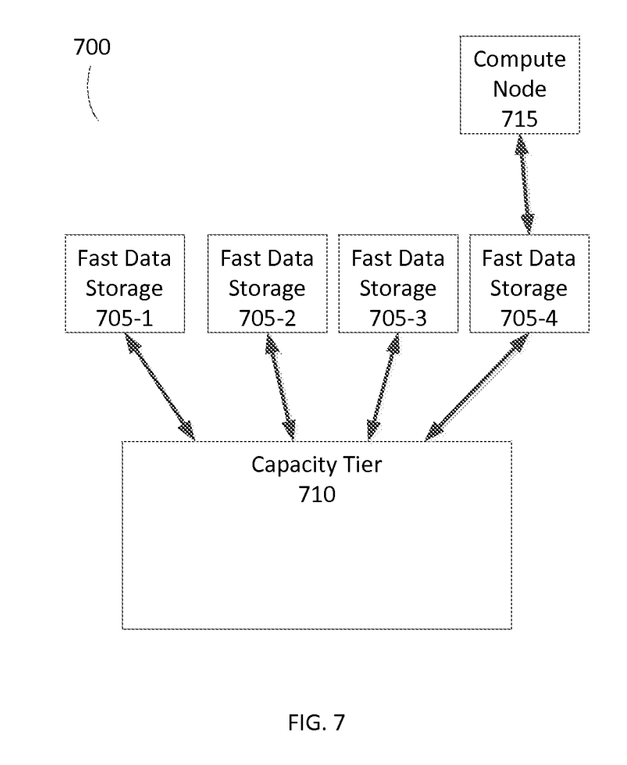
FIG. 7 is an alternate simplified illustration of a two tiered data storage system, in accordance with an embodiment of the present disclosure.

Refer to the example embodiment of FIG. 7. FIG. 7 is an alternate simplified illustration of a two tiered data storage system, in accordance with an embodiment of the present disclosure. As shown, two tiered data storage system 700 includes fast data storage (705-1 . . . 4, 705 Generally) and capacity tier 710. In many embodiments, a capacity tier may include one or multiple data storage arrays and/or data storage systems. In various embodiments a capacity tier may implement one or multiple filesystems, including file, block, object, and/other other file systems. Each of Fast data storage 705 are enabled to communicate with capacity tier 710.

In this embodiment, compute node 715 is enabled to communicate with Fast Data Storage 705-4. Through fast data storage 705-4, compute node 715 is enabled to access data storage provided through each of fast data storage 705 and/or capacity tier 710. In this embodiment, an I/O Dispatcher on fast data storage 705-4 is enabled to analyze a job received from compute node 715. I/O Dispatcher on fast data storage 705-4 is enabled to determine what level of resilience would be most efficient to use with the job from compute node 715. I/O Dispatcher is enabled to dynamically configure fast data storage 705-1, 705-2, 705-2, and 705-4 to provide an appropriate level of resilience for the job from compute node 715.

In many embodiments, fast data storage may be enabled to provide reliable data storage, unreliable data storage, and/or partially reliable data storage using the same fast data storage. For example in this embodiment, Fast data storage 705-1 is enabled to provide reliable data storage, unreliable data storage, and partially reliable data storage to one or multiple compute nodes simultaneously. In various embodiments, a fast data storage tier may be enabled to reconfigure its data storage dynamically on an "as needed" basis.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
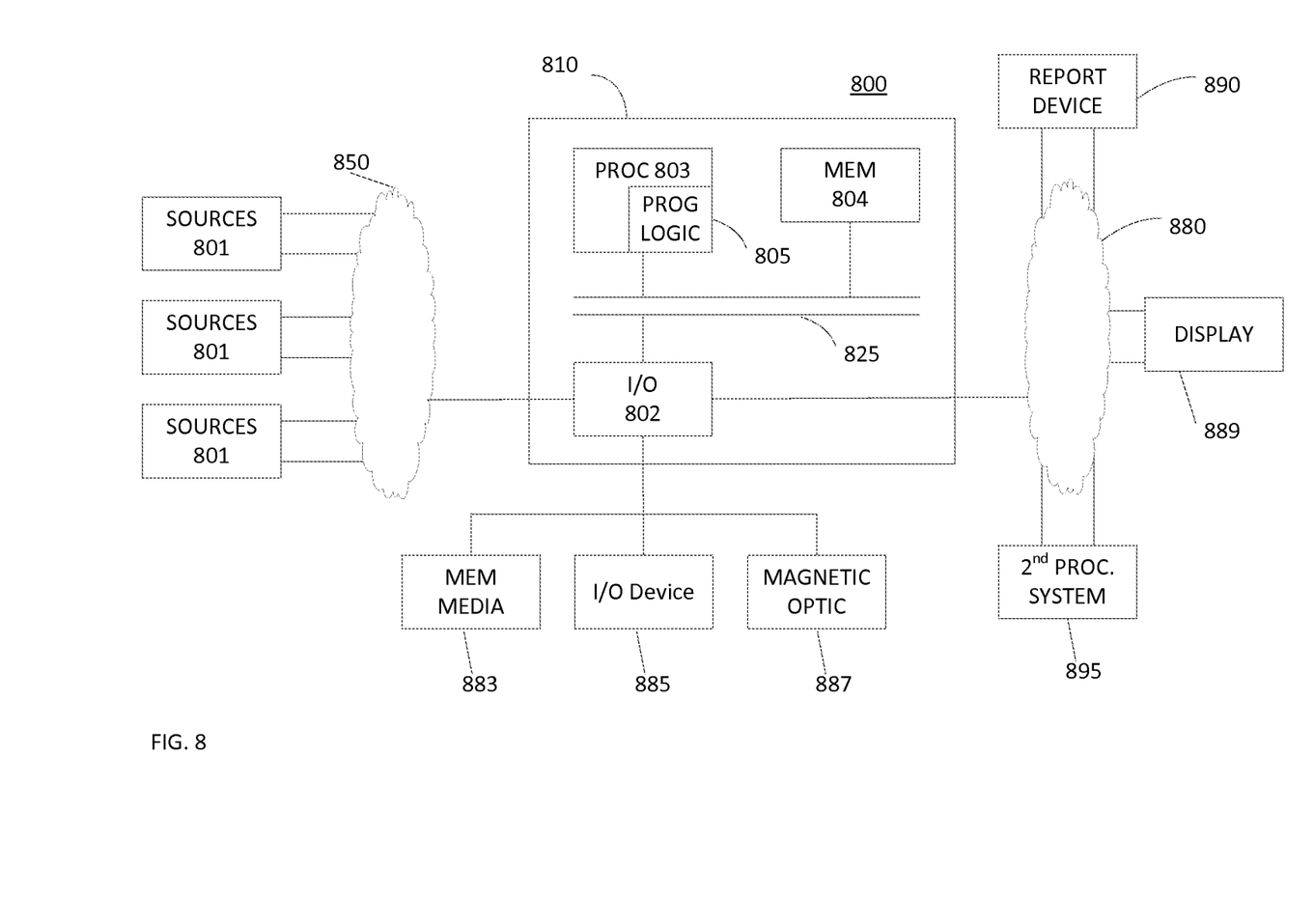
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 may include one or more I/O ports 802, a processor 803, and memory 804, all of which may be connected by an interconnect 825, such as a bus. Processor 803 may include program logic 805. The I/O port 802 may provide connectivity to memory media 883, I/O devices 885, and drives 887, such as magnetic drives, optical drives, or Solid State Drives (SSD). When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
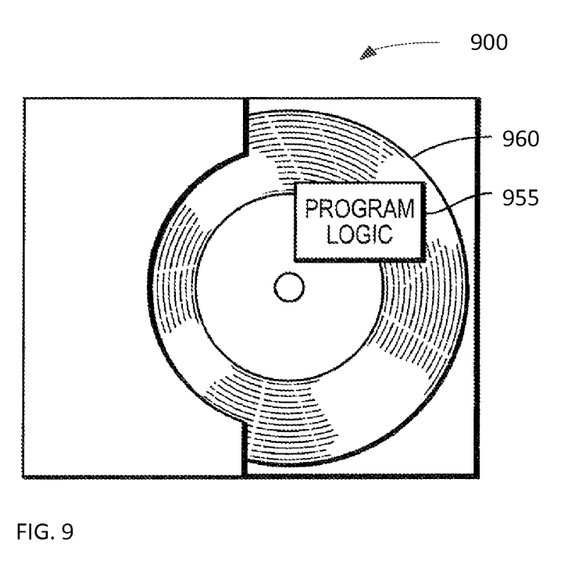
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of dynamically modifying data storage resilience within a two tiered data storage system, where the two tiered data storage system includes one or more fast data storage appliances and storage capacity tier wherein the fast data storage appliance is enabled to provide reliable data storage, the computer-executable method comprising:
   receiving, by a fast data storage appliance, configuration information from a node utilizing the two-tiered data storage system, wherein the configuration information provides characteristics of a job;
   analyzing, by an analysis module operating in the fast data storage appliance, the configuration information to determine i) how much data reliability to provide, ii) whether to protect data, and iii) what data to protect, wherein the analysis module provides the analysis to an Input/Output (I/O) dispatcher;
   dynamically creating, by the I/O dispatcher, a data storage policy based on the analysis; and
   updating, by the I/O dispatcher, use of the fast data storage appliances based on the analysis, wherein the I/O dispatcher modifies the data storage resilience for the job based on the data storage policy.

2. The computer-executable method of claim 1, wherein the analyzing comprises:
   calculating a workflow if the job used reliable fast data storage;
   calculating a second workflow if the job did not use reliable fast data storage;
   comparing the workflow to the second workflow; and
   determining an optimal workflow based on the comparison.

3. The computer-executable method of claim 2, further comprising:
   creating the data storage policy based on the optimal workflow; and
   utilizing a portion of the fast data storage appliance enabled to implement the data storage policy.

4. The computer-executable method of claim 1, wherein enabled to provide reliable data storage comprises providing a portion of the fast data storage appliances protected by Redundant Array of Independent Disks (RAID) data protection.

5. The computer-executable method of claim 1, wherein enabled to provide reliable data storage comprises providing a portion of the fast data storage appliances enabled to provide replication services.

6. The computer-executable method of claim 1, wherein enabled to provide reliable data storage comprises providing a portion of the fast data storage appliances enabled to provide data protection services while also providing a second portion of the fast data storage appliances to provide data storage without data protection services.

7. The computer-executable method of claim 1, wherein the two-tiered data storage system is enabled to provide data protection services for meta-data associated with the job.

8. A system, comprising:
   a two tiered data storage system, where the two tiered data storage system includes one or more fast data storage appliances and storage capacity tier wherein the fast data storage appliance is enabled to provide reliable data storage; and
   computer-executable program logic encoded in memory of one or more computers enabled to dynamically modify data storage resilience within the two tiered data storage system, wherein the computer-executable program logic is configured for the execution of:
   receiving, by a fast data storage appliance, configuration information from a node utilizing the two-tiered data storage system, wherein the configuration information provides characteristics of a job;
   analyzing, by an analysis module operating in the fast data storage appliance, the configuration information to determine i) how much data reliability to provide, ii) whether to protect data, and iii) what data to protect, wherein the analysis module provides the analysis to an Input/Output (I/O) dispatcher;
   dynamically creating, by the I/O dispatcher, a data storage policy based on the analysis; and
   updating, by the I/O dispatcher, use of the fast data storage appliances based on the analysis, wherein the I/O dispatcher modifies the data storage resilience for the job based on the data storage policy.

9. The system of claim 8, wherein the analyzing comprises:
   calculating a workflow if the job used reliable fast data storage;
   calculating a second workflow if the job did not use reliable fast data storage;
   comparing the workflow to the second workflow; and
   determining an optimal workflow based on the comparison.

10. The system of claim 9, wherein the computer-executable program logic is further configured for the execution of:
creating the data storage policy based on the optimal workflow; and
utilizing a portion of the fast data storage appliance enabled to implement the data storage policy.

11. The system of claim 8, wherein enabled to provide reliable data storage comprises providing a portion of the fast data storage appliances protected by Redundant Array of Independent Disks (RAID) data protection.

12. The system of claim 8, wherein enabled to provide reliable data storage comprises providing a portion of the fast data storage appliances enabled to provide replication services.

13. The system of claim 8, wherein enabled to provide reliable data storage comprises providing a portion of the fast data storage appliances enabled to provide data protection services while also providing a second portion of the fast data storage appliances to provide data storage without data protection services.

14. The system of claim 8, wherein the two-tiered data storage system is enabled to provide data protection services for meta-data associated with the job.

15. A computer program product for dynamically modifying data storage resilience within a two tiered data storage system, where the two tiered data storage system includes one or more fast data storage appliances and storage capacity tier wherein the fast data storage appliance is enabled to provide reliable data storage, the computer program product comprising:
a non-transitory computer readable medium encoded with computer-executable code, the code configured to enable the execution of:
receiving, by a fast data storage appliance, configuration information from a node utilizing the two-tiered data storage system, wherein the configuration information provides characteristics of a job;
analyzing, by an analysis module operating in the fast data storage appliance, the configuration information to determine i) how much data reliability to provide, ii) whether to protect data, and iii) what data to protect, wherein the analysis module provides the analysis to an Input/Output (I/O) dispatcher;
dynamically creating, by the I/O dispatcher, a data storage policy based on the analysis; and
updating, by the I/O dispatcher, use of the fast data storage appliances based on the analysis, wherein the I/O dispatcher modifies the data storage resilience for the job based on the data storage policy.

16. The computer program product of claim 15, wherein the code is further configured to enable the execution of:
calculating a workflow if the job used reliable fast data storage;
calculating a second workflow if the job did not use reliable fast data storage;
comparing the workflow to the second workflow; and
determining an optimal workflow based on the comparison.

17. The computer program product of claim 16, wherein the code is further configured to enable the execution of:
creating the data storage policy based on the optimal workflow; and
utilizing a portion of the fast data storage appliance enabled to implement the data storage policy.

18. The computer program product of claim 15, wherein enabled to provide reliable data storage comprises providing a portion of the fast data storage appliances protected by Redundant Array of Independent Disks (RAID) data protection.

19. The computer program product of claim 15, wherein enabled to provide reliable data storage comprises providing a portion of the fast data storage appliances enabled to provide data protection services while also providing a second portion of the fast data storage appliances to provide data storage without data protection services.

20. The computer program product of claim 15, wherein the two-tiered data storage system is enabled to provide data protection services for meta-data associated with the job.

* * * * *